(12) United States Patent
Yagyu

(10) Patent No.: US 8,616,709 B2
(45) Date of Patent: Dec. 31, 2013

(54) PROJECTION DISPLAY APPARATUS

(75) Inventor: Shinji Yagyu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 568 days.

(21) Appl. No.: 12/483,395

(22) Filed: Jun. 12, 2009

(65) Prior Publication Data

US 2010/0034225 A1 Feb. 11, 2010

(30) Foreign Application Priority Data

Aug. 7, 2008 (JP) .................. 2008-203668

(51) Int. Cl.
| | | |
|---|---|---|
| G03B 21/20 | (2006.01) | |
| G03B 21/26 | (2006.01) | |
| G03B 27/52 | (2006.01) | |
| G02B 6/04 | (2006.01) | |
| G02B 6/36 | (2006.01) | |
| G02B 6/44 | (2006.01) | |
| G02B 21/26 | (2006.01) | |
| G01S 1/00 | (2006.01) | |
| G09B 9/00 | (2006.01) | |
| G09F 13/18 | (2006.01) | |
| D03D 15/00 | (2006.01) | |
| F21V 7/04 | (2006.01) | |
| F21V 5/00 | (2006.01) | |
| F21V 29/00 | (2006.01) | |
| H01S 3/00 | (2006.01) | |
| H01S 3/30 | (2006.01) | |

(52) U.S. Cl.
USPC ............... 353/85; 353/94; 362/553; 362/554; 362/556; 362/580; 385/76; 385/115; 385/901

(58) Field of Classification Search
USPC ................. 353/31, 52, 85, 122, 94; 372/34; 362/551, 553–554, 556, 580–582; 385/54–55, 76, 115, 901; 349/62
See application file for complete search history.

(56) References Cited

U.S. PATENT DOCUMENTS

| | | | |
|---|---|---|---|
| 4,950,268 A * | 8/1990 | Rink ................................ 606/12 |
| 7,692,848 B2 * | 4/2010 | Furuya et al. .................. 359/328 |
| 8,047,655 B2 * | 11/2011 | Yagyu .............................. 353/31 |
| 8,113,661 B2 * | 2/2012 | Yagyu .............................. 353/31 |
| 2004/0240495 A1 * | 12/2004 | Akamatsu ........................ 372/32 |
| 2005/0244115 A1 * | 11/2005 | Bocanegra et al. ........... 385/110 |
| 2006/0066760 A1 | 3/2006 | Cho et al. |
| 2008/0111974 A1 * | 5/2008 | Plut ................................. 353/31 |

FOREIGN PATENT DOCUMENTS

| | | |
|---|---|---|
| JP | 2000-131665 A | 5/2000 |
| JP | 2003-307633 A | 10/2003 |

(Continued)

*Primary Examiner* — Tony Ko
*Assistant Examiner* — Jori S Reilly-Diakun
(74) *Attorney, Agent, or Firm* — Birch, Stewart, Kolasch & Birch, LLP

(57) ABSTRACT

In a projection display apparatus in which a laser beam source and an optical engine are connected together through an optical fiber, safety is improved against temperature rise in the optical fiber and its periphery. A projection display apparatus includes a temperature sensor 4 provided on the end portion, of the side of an optical engine 6, of an optical fiber group 1 for connecting a laser beam source 5 and the optical engine 6 to each other, in which, by detecting temperature and informing to a controlling unit 71 for controlling the laser beam source 5, when temperature rise exceeding a set value having been set previously is detected, the controlling unit 71 is made to control so as to decrease or stop output from the laser beam source 5.

8 Claims, 5 Drawing Sheets

(56) References Cited

FOREIGN PATENT DOCUMENTS

| | | |
|---|---|---|
| JP | 2004-207420 A | 7/2004 |
| JP | 2006-91867 A | 4/2006 |
| JP | 2007-133161 A | 5/2007 |
| WO | WO 02/067390 A1 | 8/2002 |
| WO | WO-2008/093545 A1 | 8/2008 |

* cited by examiner

PROJECTION DISPLAY APPARATUS

BACKGROUND OF THE INVENTION

1. Field of the Invention

The present invention relates to a safety function with respect to an optical fiber used in a projection display apparatus in which a laser beam source and the optical fiber are included.

2. Description of the Related Art

In a conventional projection display apparatus, an incoherent and relatively low brightness light source such as a mercury lamp or a light emitting diode (LED) has been used. An example of a thin optical system whose light source is a mercury lamp is disclosed in page 6, and FIG. 2 of Japanese Patent Application Publication Laid-Open No. 2006-91867 (Patent Document 1). On the other hand, because a laser system excels in its beam directivity and high brightness, the system is useful as a light source used in a projection display apparatus. By installing a laser beam source, a compact optical system can be obtained, and a compact optical engine suitable for thinning a projection display apparatus can be obtained (as to an example of a projection display apparatus that utilizes a laser beam as its light source, refer to page 4 and FIG. 1 of Japanese Patent Application Publication Laid-Open No. 2000-131665 (Patent Document 2)).

By using a laser beam excellent in focusibility as a light source for a projection display apparatus, the optical engine thereof can be made compact. However, because in the system the laser beam source and the optical engine need to be arranged collinearly with each other, the degree of freedom of arranging parts of the system in the projection display apparatus is relatively low; thus, thinning of a overall projection display apparatus has been restricted. In order to solve the problem, if the laser beam source and the optical engine are connected to each other through an optical fiber, because light can be transmitted through the optical fiber even though it is bended, the laser beam source and the optical engine connected through the optical fiber do not need to be arranged collinearly with each other; therefore, the degree of positional freedom of placing the parts is increased. Thinning of the overall projection display apparatus can be resultantly realized.

However, when a laser beam is transmitted through an optical fiber, because the optical fiber may be damaged due to local heating up, a system safety needs to be secured against temperature rise.

SUMMARY OF THE INVENTION

An objective of the present invention, which is made to solve the above described problem, is to provide a projection display apparatus in which safety is improved against temperature rise in the optical fiber and its periphery.

A projection display apparatus according to the present invention is configured, including a temperature sensor at the emitting end of an optical fiber, to control the output from a laser beam source when a rising temperature is detected to exceed a predetermined value.

DETAILED DESCRIPTION OF THE PREFERRED EMBODIMENT

Embodiment 1

Figure 1:
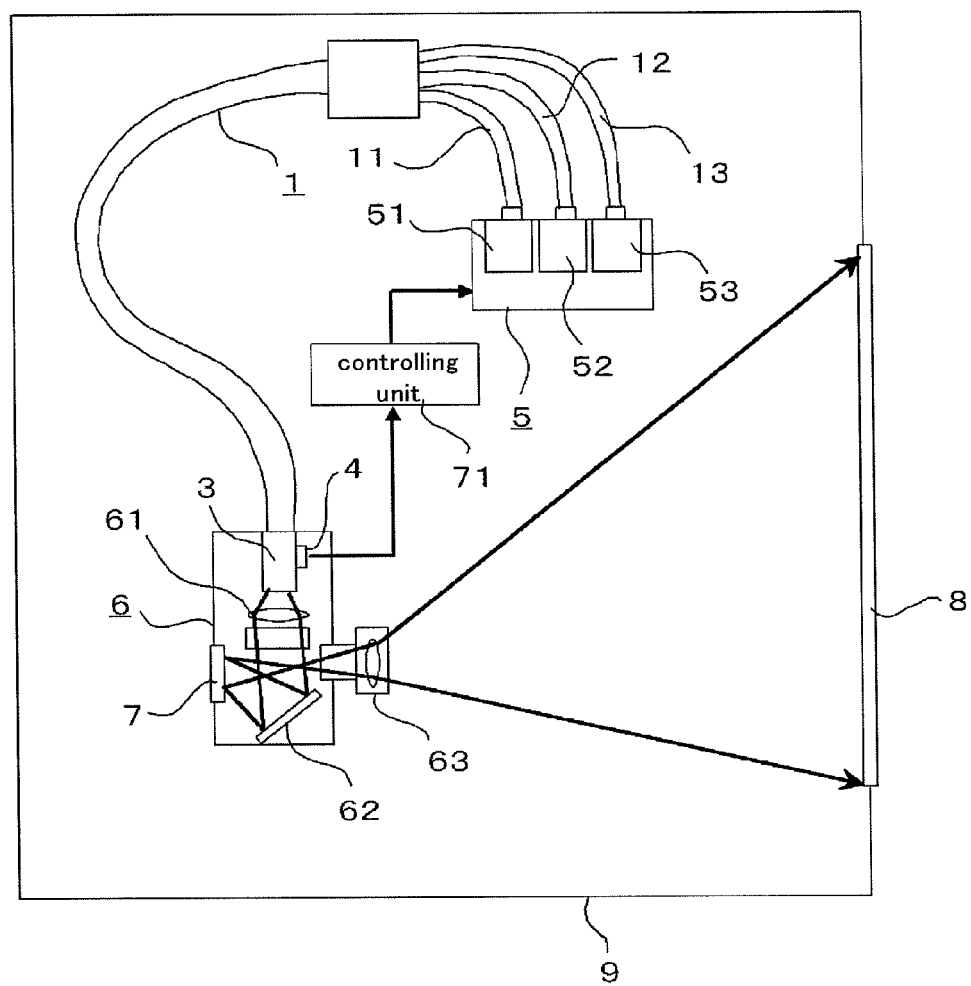
FIG. 1 is a configuration view of a projection display apparatus representing Embodiment 1 according to the present invention.

FIG. 1 is a configuration view illustrating a projection display apparatus according to Embodiment 1. The projection display apparatus according to this embodiment includes a laser beam source 5, an optical engine 6, an optical fiber group 1 connecting those with each other, a controlling unit 71 for controlling the output from the laser beam source 5, a holder 3 provided at the end of the side of the optical engine 6 of the optical fiber group 1, and a temperature sensor 4 mounted to contact the outer face of the holder 3. The optical fiber group 1 whose emitting end is inserted inside the holder 3 is thus fixed to the optical engine 6. The laser beam source 5 includes a plurality of laser source units 51, 52, and 53 corresponding to respective monochromatic laser beams. The optical fiber group 1 is configured with optical fibers 11, 12, and 13 connected to the laser source units 51, 52, and 53, respectively, being bundled together halfway, into a unified optics, and has a single emitting end. In the optical engine 6, optical elements such as a lens 61 and a reflection mirror 62, a display device 7, and a magnification projection lens 63 are arranged. A casing 9 is provided so as to cover the entire apparatus, on a side of which is attached a large size screen 8.

Next, an operation is explained. A laser beam outputted from the laser beam source 5 is inputted into the optical engine 6 through the optical fiber group 1 as a laser transmission optical path. The laser beam inputted into the optical engine 6 passes through the lens 61, and, after being turned around by the reflection mirror 62, is incident on the display device 7; then, its image is magnified and projected on the screen 8 through the magnification projection lens 63.

A temperature sensor 4 is mounted on the outer surface of the holder 3 in contact therewith, which detects the temperature of the holder 3, and outputs signals for informing the temperature to the controlling unit 71. When the temperature sensor 4 detects a temperature higher than a predetermined value, the controlling unit 71 operates to decrease or stop the output from the laser beam source 5. Here, the temperature sensor 4 may be designed to output signals only when the temperature sensor 4 detects an increase of temperature higher than a predetermined value, and then to inform the controlling unit that the temperature has risen exceeding the predetermined value. Moreover, the holder 3 whose temperature is directly detected is preferable to be configured using a material, such as metal, having high thermal conductivity.

As an optical fiber used in this embodiment, an optical fiber whose core layer and clad layer are both formed of glass can be exemplified; however, in an optical fiber of this kind, the difference between the refractive indexes of the core and the clad material thereof is difficult to be increased. Therefore, in this embodiment, a plastic fiber is suitably used by which the F number of the optical system according to the projection display apparatus can be reduced.

Furthermore, considering its costs, a plastic fiber is desirably used whose core layer through which a laser beam passes is formed of quartz (the refractive index is approximately 1.46 at 546 nm), and whose clad layer is formed of a plastic material such as UV-curable resin for optical use. The refractive index of the UV-curable resin is, for example, 1.38-1.47 at 589 nm. As clad-layer material, a resin whose refractive index is sufficiently lower than that of the quartz for the optical fiber may be selected from such materials.

Figure 2:
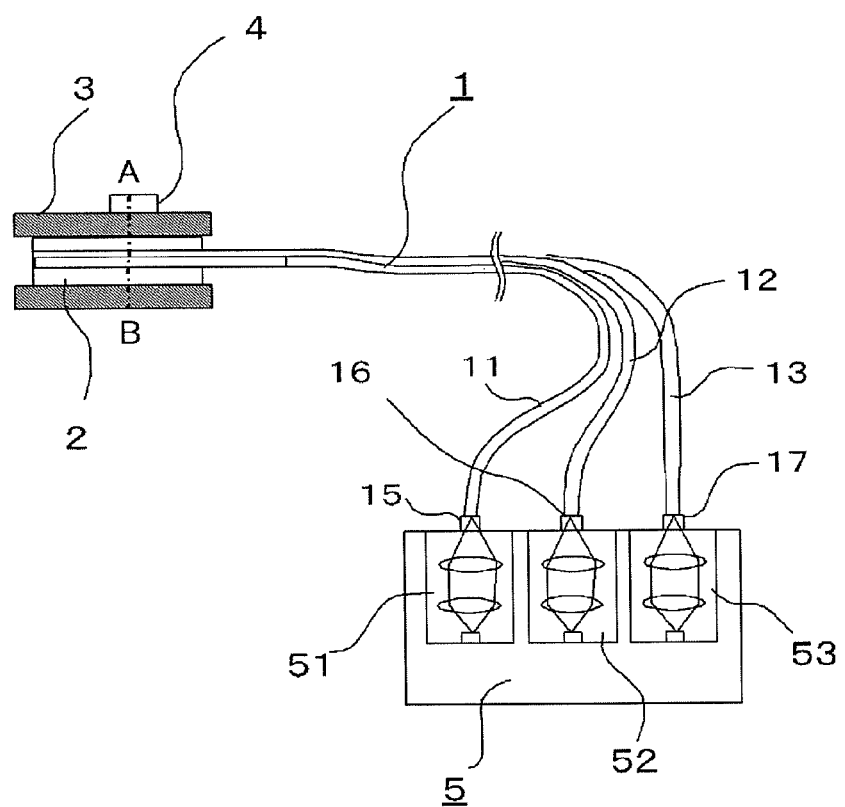
FIG. 2 is a view illustrating a detailed configuration of incident and emitting end portions of optical fibers according to Embodiment 1 of the present invention.

FIG. 2 is a view illustrating a specific configuration of the optical fiber group 1 and its incident and emitting ends. In order to represent an internal structure, not illustrated in FIG. 1, of the holder 3, the structure near emitting-end side is represented by a cross-sectional view. Numeral 2 denotes a binding member for bundling the plurality of optical fibers 11, 12, and 13 together, and Numerals 15, 16, and 16 are connectors fixed to a side of the laser beam source 5 (incident ends) of the optical fibers 11, 12, and 13, respectively. The other numerals are the same as those in FIG. 1; therefore, the explanation is omitted.

Here, a structure of the laser beam source 5 and the side of the incident ends of the optical fibers 11, 12, and 13 is explained in detail. Each of the laser source units 51, 52 and 53 includes an emitter for emitting a laser beam of its color and a coupling optical system for collecting and focusing the light beam emitted from the emitter, and the face of the incident end of the optical fiber is positioned at a light spot where the light beam is focused, so that light energy is effectively transmitted. The laser beams transmitted to the optical fibers 11, 12, and 13 through the coupling optical systems are led into the optical engine 6 according to the light transmission operation.

Portions of the optical fibers 11, 12, and 13 where the plastic clad layers are removed over a specific length from the incident end are being inserted into their respective connectors 15, 16, and 17 fixed to the incident ends of the optical fibers 11, 12, and 13, and the optical fibers are being mechanically clamped from the outside thereof at the portions apart a given length from the incident end where the clad layer remains, so that metal connectors are fixed to the respective fibers. Therefore, because only the glass core exists at the end where the laser beam is incident, the probability of causing breakage due to over heating, of the parts can be drastically reduced on the side of this incident end.

In contrast, for dealing with a temperature increase at the emitting end of the optical fiber group 1, it is difficult to apply a similar way applied to the incident end for making a connection to the optical engine 6. That is because the cross-sectional area of the emitting end is determined by optical design of the optical engine, and therefore, in order to improve light transmission efficiency, the optical fibers have to be contacted each other as tightly as possible and tucked into the area; thus, in many cases, there is no space to independently fix connectors, as those used at the incident-end side, to the optical fibers, after the plastic clad layers have been removed. Therefore, another measure against temperature rise is needed at the emitting-end side of the optical fiber group 1. Accordingly, the temperature sensor 4 is fixed to the emitting-end side, and thus when the temperature sensor 4 detects a temperature rise exceeding a previously set value, the controlling unit 71 is made control the output from the laser beam source to decrease or stop.

Figure 3A:
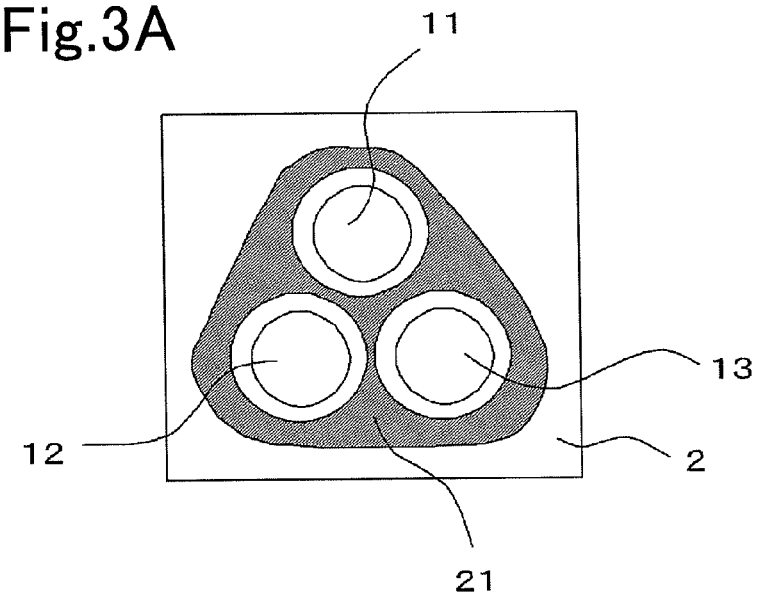
FIG. 3A and FIG. 3B each are a cross-sectional view, according to Embodiment 1 of the present invention, of the emitting-end portion when a plurality of optical fibers having the same diameter are bundled, where its holder and temperature sensor are omitted.
Figure 3B:
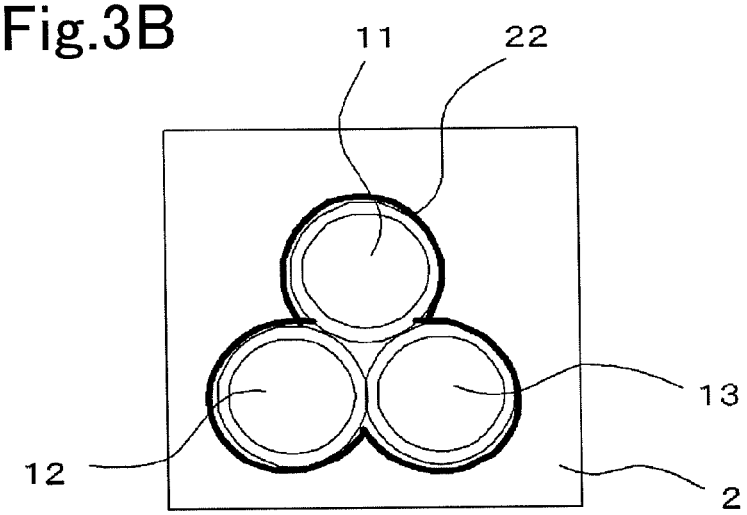
Figure 4:
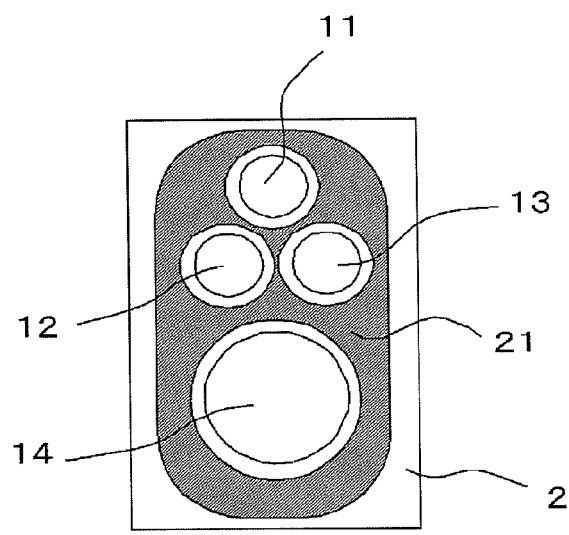
FIG. 4 is a cross-sectional view, according to Embodiment 1 of the present invention, of the emitting-end portion when the optical fibers having diameters different from each other are bundled, where the holder and the temperature sensor are omitted.

FIG. 3A, FIG. 3B, and FIG. 4 are cross-sectional views illustrating cross sections cut along Line A-B at the emitting-end portion in FIG. 2, in which the holder 3 and the temperature sensor 4 are omitted for simplicity. FIG. 3A and FIG. 3B are views illustrating a case in which the optical fibers 11, 12, and 13 whose diameters are equal to each other are bundled, and FIG. 4 is a view illustrating a case in which another optical fiber 14 having a diameter different from that of the optical fibers 11, 12, and 13 is added thereto. When a plurality of fibers whose diameters are equal to each other is used, they can be fixed to the binding member 2 using an adhesive 21 as represented in FIG. 3A. Additionally, by using a clamp 22 having a shape circumscribing the closely bundled optical fibers 11, 12, and 13 as illustrated in FIG. 3B, the plurality of optical fibers may be bundled without using the adhesive.

On the other hand, when a plurality of fibers whose diameters are different from each other are bundled, in order to reduce assembly costs by simplifying assembly operation and saving its time, a method of using the adhesive 21 is desirable as illustrated in FIG. 4. In the method of bundling fibers using a clamp, the bundling operation is complicated and less efficient.

As described above, from a viewpoint of workability, it is desirable to use an adhesive as a means of fixing the optical fiber group 1 with the binding member 2. When an adhesive is used, it is important to take measure dealing with the temperature rise for a case in which breakage of the optical fibers 11, 12, and 13 occurs. Hereinafter, the measure is explained.

Light to be confined in the core by the full-reflection operation at the interface between the core and the clad layer, may possibly pass through the interface when any breakage occurs in the optical fibers for some reason, to travel into the clad layer. Here, in a case the adhesive 21 adhered outside the clad layer has a refractive index higher than that of the material forming the light clad layer, the laser-beam component leaks out and heats up the perimeter of the breakage, which then is likely to increasingly damage the portion. Therefore, when an adhesive is used, how to secure safety in case of an emergency occurrence becomes important. As the adhesive material, silicon resin or epoxy resin can be used; however, when a high-adhesive epoxy resin is used, although the it is advantageous in binding strength and workability, because its refractive index is mostly higher than 1.5, a temperature rise of the adhesive might occur by the light leakage, causing its burnout.

Figure 5:
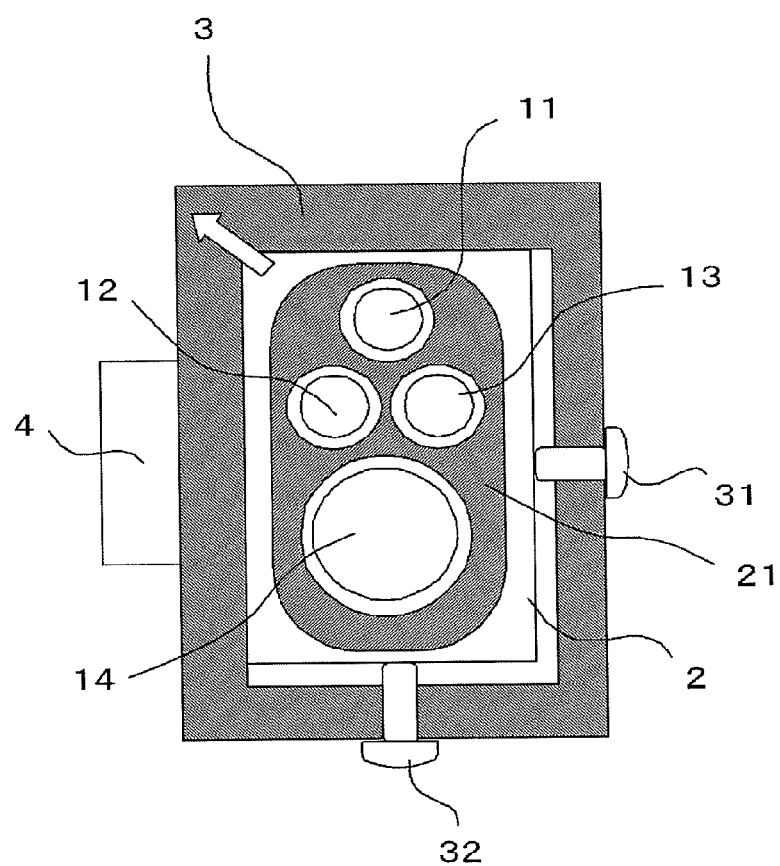
FIG. 5 is a cross-sectional view, according to Embodiment 1 of the present invention, of the emitting-end portion when the optical fibers having diameters different from each other are bundled.

FIG. 5 is a cross-sectional view illustrating a cross section cut along Line A-B at the emitting-end portion in FIG. 2, in which the holder 3 and the temperature sensor 4 are represented without being omitted. Numerals 31 and 32 show screws that give force to press, in the direction of the arrow represented in the figure, the binding member 2 inserted in the space provided inside the holder 3. Because the other numerals are the same as those in FIG. 2, the explanation is omitted. According to such configuration, because, by the force of the screws 31 and 32, the outer wall of the binding member 2 and the inner wall of the holder 3 can be in face-to-face contact at least over a large area, the heat can be effectively transmitted. The temperature rise of the optical fibers 11, 12, and 13, and the adhesive 21 provided therearound can be detected in a short time. Here, the binding member 2 and the holder 3 are desirable to be made of a high heat-conductive material, such as metal.

Here, as the temperature sensor 4, a thermistor can be used. The predetermined value for the rising temperature used for controlling decreasing or stopping the laser output from the laser beam source 5, is suitably set depending on, for example, a required safety level and a property of material of the optical fiber group 1. Moreover, as the laser source units 51, 52, and 53 of the laser beam source 5, high-power units such as W-class laser systems can be used.

According to the above described configuration of the projection display apparatus, because a laser beam source having excellent focusability is used as the light source, the optical engine can be made compact. Moreover, because the laser beam source and the optical engine are connected to each other using the optical fibers, the degree of freedom of arranging the laser beam source and the optical engine increases, and thinning of the projection display apparatus can be resultantly realized.

The temperature sensor is provided at the emitting end of the optical fibers and when a rising temperature exceeding the set value is detected, the output from the laser beam source is controlled to decrease or stop, thereby ensuring an improved system safety against the temperature rise.

Because a plurality of single-core fibers are bundled and tightly contacted with each other, the light transmission efficiency can be improved.

Because the optical fibers are configured to be connected to the optical engine as being supported by the heat-conductive holder provided in the optical engine, the temperature sensor can be easily mounted.

Because the end portion of the plurality of optical fibers is covered with the rectangular-columnar heat-conductive material and the covered portion is being inserted into the heat-conductive holder having the rectangular-columnar inner space to be in face-to-face contact therewith over a large area, the temperature rise at the emitting end of the optical fibers can be immediately detected; accordingly, a safe, easy-to-fix and highly reliable projection display apparatus can be provided.

Because, by using the optical fibers configured with the glass cores and the plastic clad layers, their cost is reduced providing a low-cost projection display apparatus.

Additionally, because the configuration of the projection display apparatus is suitable for mass production, the apparatus can be constructed at low cost.

The present invention may be applied to, for example, a consumer TV or an industrial rear projector, having high-output laser beam source.

What is claimed is:

1. A projection display apparatus comprising:
a laser beam source for outputting a laser beam;
an optical engine for receiving the laser beam outputted from the laser beam source through an optical fiber group, and magnifying and outputting an image;
a temperature sensor for detecting a temperature of the optical fiber group; and
a controlling unit for controlling the output from the laser beam source in response to an output from the temperature sensor to prevent heat related damage to the optical fiber group, wherein the temperature sensor is provided at an emitting end of the optical fiber group such that when the temperature of the optical fiber group exceeds a predetermined threshold value, the controlling unit decreases or stops the laser output from the laser beam source.

2. A projection display apparatus as recited in claim 1, wherein the laser beam source includes a plurality of laser source units, and the optical fiber group includes a plurality of bundled optical fibers each being connected to each of the laser source units.

3. A projection display apparatus as recited in claim 1, wherein the optical fiber group is supported by a heat conductive holder provided in the optical engine and connected thereto, and the temperature sensor is provided on the heat conductive holder.

4. A projection display apparatus as recited in claim 3, further comprising a heat-conductive binding member for bundling a plurality of optical fibers, wherein the outer face of the heat-conductive binding member is contacted to an inner face of the heat conductive holder.

5. A projection display apparatus as recited in claim 1, wherein an end portion of the optical fiber group is covered with a rectangular-columnar heat-conductive material and the covered portion is configured to be inserted into a heat-conductive holder having a rectangular-columnar inner space to be in face-to-face contact therewith over a large area in order to detect the temperature rise at the emitting end of the optical fiber group.

6. A projection display apparatus as recited in claim 1, wherein said optical fiber group comprises a plurality of bundled optical fibers each having a core layer and a clad layer, and wherein said core layer through which the laser beam passes is formed of a material having a first refractive index and the clad layer is formed of a material having a second refractive index, and the first refractive index is higher than the second refractive index.

7. A projection display apparatus as recited in claim 6, wherein the first refractive index is approximately 1.46 at 546 nm.

8. A projection display apparatus as recited in claim 6, wherein the second refractive index is approximately 1.38 at 589 nm.

* * * * *